(12) United States Patent  
Rizzi

(10) Patent No.: US 8,187,509 B2
(45) Date of Patent: May 29, 2012

(54) GRANULATION PROCESS AND APPARATUS

(75) Inventor: Enrico Rizzi, Casnate Con Bernate (IT)

(73) Assignee: Urea Casale S.A. (CH)

(*) Notice: Subject to any disclaimer, the term of this patent is extended or adjusted under 35 U.S.C. 154(b) by 261 days.

(21) Appl. No.: 12/663,576

(22) PCT Filed: Jun. 6, 2008

(86) PCT No.: PCT/EP2008/004521
§ 371 (c)(1),
(2), (4) Date: Apr. 26, 2010

(87) PCT Pub. No.: WO2009/000395
PCT Pub. Date: Dec. 31, 2008

(65) Prior Publication Data
US 2010/0289165 A1   Nov. 18, 2010

(30) Foreign Application Priority Data

Jun. 27, 2007 (EP) .................................. 07012561

(51) Int. Cl.
*B29B 9/00* (2006.01)
(52) U.S. Cl. ............. 264/5; 264/8; 264/9; 425/6; 425/8; 425/456
(58) Field of Classification Search .................. 264/5, 8, 264/9; 425/6, 8, 456
See application file for complete search history.

(56) References Cited

U.S. PATENT DOCUMENTS

| 3,274,642 A | 9/1966 | Cramer |
| 4,585,167 A | 4/1986 | Kholin |
| 5,628,937 A * | 5/1997 | Oliver et al. ................ 264/9 |

FOREIGN PATENT DOCUMENTS

| DE | 863660 C | 1/1953 |
| EP | 0233384 A2 | 8/1987 |
| WO | 2004/101131 A1 | 11/2004 |

* cited by examiner

*Primary Examiner* — Joseph Del Sole
*Assistant Examiner* — James Sanders
(74) *Attorney, Agent, or Firm* — Akerman Senterfitt

(57) ABSTRACT

A granulation process wherein a liquid is sprayed into a prilling tower (1) by means of a rotating prilling bucket (15) having a perforated side wall (15a), and the liquid jets exiting said perforated side wall are subjected to a vibrating action according to the axial direction (A-A) of the prilling tower (1), while the remaining liquid mass inside the bucket is kept substantially free from said vibrating action. A suitable apparatus is also disclosed, wherein the peripheral side wall (15a) of the prilling bucket (15) is connected to vibration imparting means and has a flexible connection with the frame (15b, 15c) of the bucket.

16 Claims, 2 Drawing Sheets

GRANULATION PROCESS AND APPARATUS

FIELD OF APPLICATION

The present invention relates, in its most general aspect, to the granulation of a fluid or semi-fluid substance.

In particular, the invention relates to a granulation process wherein a fluid substance is fed to a rotating prilling bucket located inside a prilling tower, containing a given liquid mass of said substance and having a perforated side wall, and said fluid substance is sprayed from said prilling bucket into the prilling tower in the form of liquid jets through said perforated side wall. The invention also relates to an apparatus adapted to carry out the above method. A preferred application of the invention is the production of granules or prills of urea.

PRIOR ART

The granulation of a given substance available in a fluid state (e.g. dispersed or dissolved in a liquid phase, or even in melted state) is performed in a cylindrical tower, also known as prilling tower, wherein a downward flow of small droplets of said substance is produced, and a rising flow of a suitable cooling gaseous medium (e.g. air) is provided in a counter-current arrangement, so that the falling drops are solidified into substantially spherical granules.

A known way of producing said downward flow of small droplets is to feed the liquid substance to a perforated container, also known as prilling bucket. Generally, the prilling bucket is located on top of the prilling tower and is rotating around the vertical axis of the prilling tower.

A major challenge of the granulation process is to produce a monodispersed flow, i.e. a flow of liquid droplets having (as much as possible) the same shape, preferably spherical, and the same size. The solid granules obtained from a monodispersed flow, being uniform in shape and size, are a product of better quality.

To improve the uniformity of liquid droplets, it is known to subject the liquid jets to some kinds of disturbance, which help to break the liquid jets into droplets. To this purpose, it is known to use a rotating and vibrating prilling bucket, where the liquid jets are subjected to a disturbance in the form of a vibration directed in accordance with the vertical axis of the tower.

U.S. Pat. No. 4,585,167 discloses a method of dividing a bulk liquid into drops with a perforated container, and discloses rotating and oscillating the container for applying disturbance of the fluid jets.

In the following description, the term "vibrating technique" refers in a general way to a granulation process wherein, as stated above, the liquid substance to be granulated is fed to a prilling bucket with a perforated side wall, and said prilling bucket is vibrated according to the vertical axis of the prilling tower in order to provide a disturbance to liquid jets and promote the formation of uniformly-sized droplets.

It has been found that the vibration of the bucket and liquid contained therein improves the approximation of a monodispersed flow, i.e. a vibrating bucket yields a better uniformity of the granules compared to a non-vibrating bucket rotating at the same speed. However, there is a continuous need of improving the monodispersion of droplets, especially at high rotational speed when a monodispersed flow is more difficult to achieve. In particular, the obtention of a good monodispersion is more difficult at speeds higher than 50-80 rpm (revolutions per minute).

It should be understood that the above value of 50-80 rpm has been cited for the purpose of example, and may vary depending on the circumstances. In any case, a medium- or large-sized plant requires a bucket rotating at high speed, namely 200-300 rpm, for economical reasons. As a general rule, a high rotating speed is desired to achieve a good production rate, especially in large plants, wherein it is preferred to have a single bucket at the centre of the tower rather than a plurality of buckets rotating at a lower speed.

Thus, there is still the need to improve the performance of the aforementioned vibrating technique, at any rotational speed but particularly at high speed as required in large plants.

SUMMARY OF THE INVENTION

The technical problem underlying the invention is to satisfy the above needs, i.e. to find a method and apparatus adapted to improve the monodispersion of the liquid droplets in a granulation process, taking place in a prilling tower equipped with a rotating and vibrating prilling bucket, particularly when the rotation of said bucket takes place at high speed.

Said problem, according to the invention, is solved with a granulation process of a given substance in a fluid state, wherein said fluid substance is fed to a rotating prilling bucket, located inside a prilling tower, containing a given liquid mass of said substance and having a perforated side wall, and said fluid substance is sprayed from said prilling bucket into the prilling tower in the form of liquid jets through said perforated side wall, characterized in that said liquid jets are subjected to a vibration according to the axial direction of the prilling tower, while the liquid mass contained in the bucket is kept substantially free from said vibration, and said vibration is imparted to the liquid jets by subjecting said perforated side wall to a vibrating action and isolating the remaining parts of the prilling bucket from said vibrating action.

Preferably, this is accomplished by subjecting the perforated side wall to the action of suitable vibration imparting means, and by providing a bucket substantially having a frame part and a perforated side wall which is vibrationally decoupled from said frame part.

The term "vibrationally decoupled", in this description, means that the perforated side wall is connected to the frame part of the bucket by connecting means which are substantially unable to transmit the vibrating action, or it is mechanically disconnected from the frame part of the bucket. Preferably, the perforated side wall is connected to the frame part by means of a flexible connection, adapted to act as a mechanical filter for the vibrating forces transmitted by the vibration imparting means to the perforated side wall.

According to a preferred way of carrying out the invention, then, it is provided an apparatus for the granulation of a fluid or semi-fluid substance according to the above method, comprising a prilling tower and a rotating prilling bucket which is located inside said tower and connected to feeding means of said substance and to a rotating shaft, wherein the prilling bucket comprises a frame part and a perforated side wall, and is connected to suitable vibration imparting means, adapted to provide a vibrating action substantially according to the axial direction of said prilling tower, characterized in that said vibration imparting means are connected to said perforated side wall of the bucket, and a suitable flexible connection is provided between said perforated side wall of the bucket and said frame part of the same, said flexible connection being adapted to act as a mechanical filter for said vibrating action, so that the operation of said vibration imparting means results in a vibration of the perforated side wall, while the frame part of the bucket is substantially isolated from the vibrating action.

In a preferred embodiment of the above apparatus, the frame part of the prilling bucket comprises a top plate and a bottom plate; the perforated side wall is connected to said top plate by a first flexible connection, and is also connected to said bottom plate by a second flexible connection. The bucket may also comprise a set of impellers rigidly tying said top plate to said bottom plate More preferably, said first and second flexible connections are obtained through a first elastic ring, secured to a top fixing portion of the perforated side wall and to the top plate, and a second elastic ring secured to a bottom fixing portion of the side wall and to the bottom plate of the bucket.

Preferably, the elastic rings are made of an elastomer. According to another inventive feature, said elastic rings may have a multi-layered structure.

In another (not shown) embodiment, said flexible connection between the perforated side wall of the bucket and the frame part of the same is made by one or more suitable expansion joint(s) or equivalent means, such as rings or other connecting elements having a suitable thickness and/or an undulated profile, in order to provide a certain degree of flexibility for the desired effect of filtering the vibrations. More generally, it should be appreciated that any flexible connection adapted to filter the vibrations, keeping the frame part of the bucket substantially free from them, may be used.

According to another inventive feature, said flexible connection between the perforated side wall of the bucket and the frame part of the same is substantially flexible in the axial direction of the bucket, to act as a filter as described above, but substantially rigid in the torsional direction, thus being suitable to transmit a rotational driving torque from the frame part of the bucket to the side wall of the same.

Still referring to preferred embodiments, the apparatus comprises a bottom flange, supported by the rotating shaft, connected to the vibration imparting means and having a peripheral region fixed to the perforated side wall of the bucket. In a particularly preferred embodiment, said flange is elastically supported, according to the axial direction, at the bottom end of the rotating shaft, by means of one spring or a plurality of springs, acting as return spring(s), or equivalent elastic means such as buffers made of elastomer. The vibration imparting means are associated to said driving flange, preferably housed in a closed carter, so that they act directly on the flange itself. Suitable damping means may also be provided.

In further (not shown) embodiments, the perforated side wall may be mechanically disconnected from the frame part of the bucket, preferably with suitable means (gasket or equivalent) to avoid fluid leakage.

The frequency of said vibrating action is depending on the fluid substance to be granulated and on other parameters, and can be established according to known criteria, which are not discussed in detail. A preferred application is the granulation of urea.

It has been found that the uniformity of the drop flow is surprisingly improved by the above technique of putting into vibration only the peripheral side wall of the bucket, for all rotating speeds and especially at high rotating speed. More in detail, production of a very good monodispersed flow of spherical droplets, all having the same size, has been observed at very high speeds such as 300 rpm.

This good monodispersion of the droplets at high rpm leads to a more valuable final product combined with a high production rate.

Further to the advantages of a better monodispersion and better quality of the final product, the invention provides that the mass to be put into vibration is reduced compared to present vibrating buckets, being equal to the mass of the perforated side wall and of a small quantity of liquid.

There are a number of advantageous effects related to the lower vibrating mass. First, the vibrational forces on the supports and risk of mechanical failure are greatly reduced in comparison with the prior art. The above cited known solution of U.S. Pat. No. 4,585,167, for example, suffers severe stress of the driving shaft, subjected to both torsional and vibrating forces. Secondly, a reduced vibrating mass allows the use of a smaller and faster vibrating engine compared to a prior-art apparatus. It should be noted that available vibrating engines capable of generate high forces are commonly limited to a relatively low frequency of operation, while vibrating engines capable of high frequencies can produce a limited force, being unsuitable for vibrating a considerable mass. The invention allows to overcome this limitation, for example applying high frequency vibrations to a large prilling bucket rotating at high speed. Energy consumption is also reduced.

Further features and advantages will become clearer from the following description of a non-limiting example of an embodiment thereof.

DETAILED DESCRIPTION OF A PREFERRED EMBODIMENT

Figure 1:
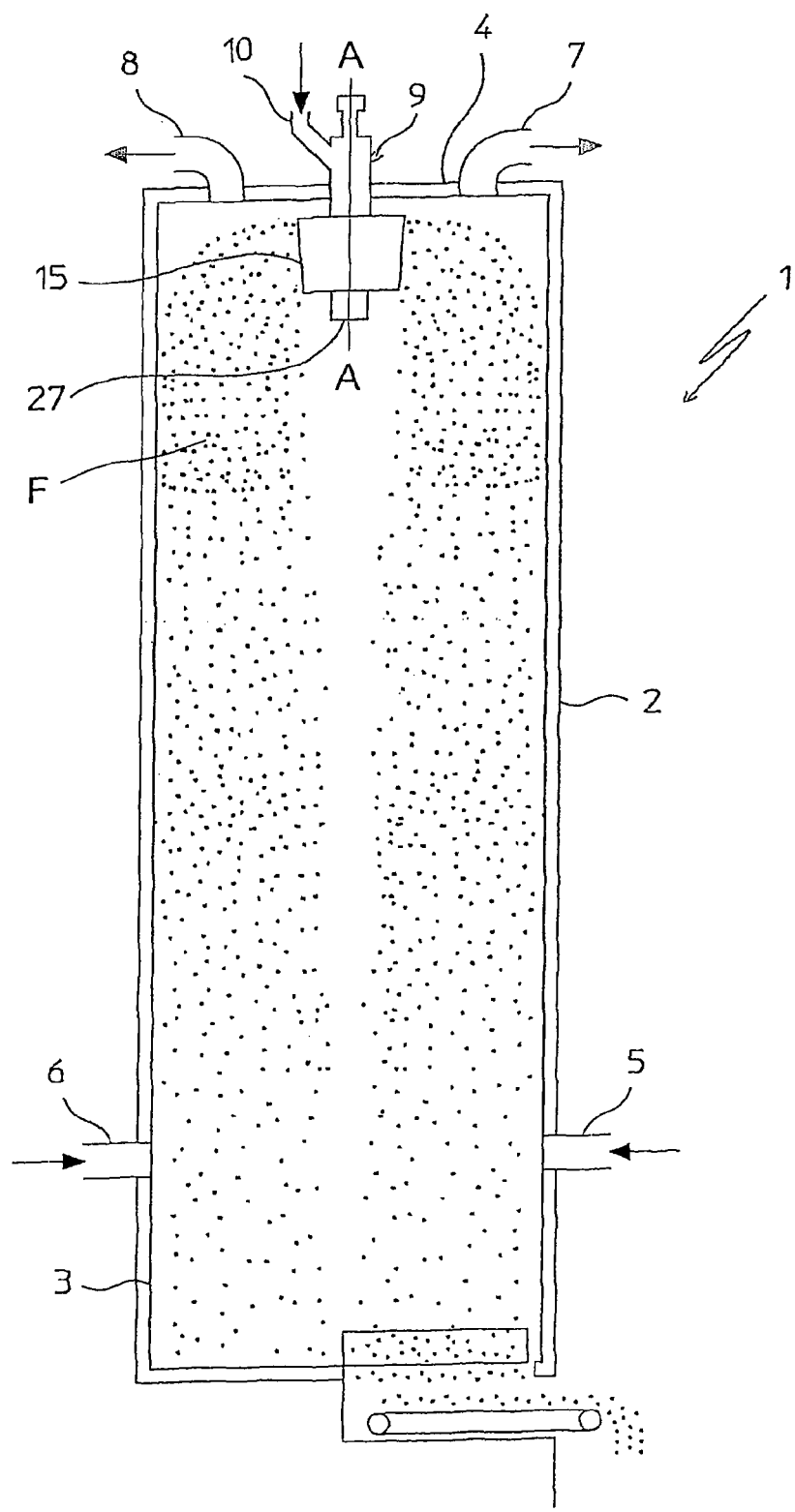
FIG. 1 shows a schematic view of an apparatus according to the present invention.

With reference to FIG. 1, an apparatus for the granulation of a liquid substance, for example urea, is shown, comprising a prilling tower 1 equipped with a prilling bucket 15. The prilling bucket 15 is located inside the tower 1 and near the top thereof.

The prilling tower 1 has a cylindrical shell 2 with a vertical axis A-A, and is closed at the opposite ends by a base plate 3 and a top wall or panel 4. Ducts 5 and 6 are provided, at the base of the shell 2, to produce a continuous rising flow of a suitable cooling gaseous medium, e.g. cooling air, into the tower 1. Further ducts 7, 8 are provided on top panel 4 to discharge the cooling medium and possibly a vapour fraction extracted from the substance to be granulated.

The top wall 4 is crossed centrally by a tubular cylindrical hopper or duct 9, for feeding the liquid substance to be granulated. More in detail, the duct 9 has a portion 9a outside the shell 2 connected to a feeding duct 10 of the liquid substance, and a portion 9b inside the shell 2 and the prilling bucket 15 (FIG. 2), featuring a plurality of slits 13 distributed on the side surface for delivering the liquid substance to the bucket 15. The duct 9 is closed, at opposite ends, by a lower plate 12 and an upper plate.

The tubular duct 9 is axially crossed by a shaft 14, coupled to a suitable engine and to the prilling bucket 15, for imparting to said bucket 15 a rotation around the vertical axis A-A at a predetermined speed.

More in detail, the prilling bucket 15 comprises a perforated, frusto-conical side wall 15a and a frame part which, in the given example, is given by an upper base 15b and a lower base 15c connected by a suitable number of impeller plates 20.

The shaft 14 supports the frame of the bucket by conventional means for example connecting the shaft to the lower base 15c.

The end of the shaft 14, below the bucket 15, is connected to a bottom flange 24, having a central portion 24a and a peripheral portion 24b, and supporting a carter 25 wherein a suitable vibrating device (or engine) 26, which is known per se, is housed.

The shaft 14 is firmly connected with a suitable key connection to the flange 24 or the bucket 15. In the example, a key 21 (or equivalent) is inserted for stable connection between shaft 14 and lower plate 15c.

Preferably, said vibrating device 26 is a pneumatic device, fed with compressed air through a main duct 27 coaxial to the shaft 14, and a further air duct 28 through the flange 24. The vibrating device 26 may also comprise a plurality of vibrating units, operated through respective air ducts fed by the main duct 27.

Figure 2:
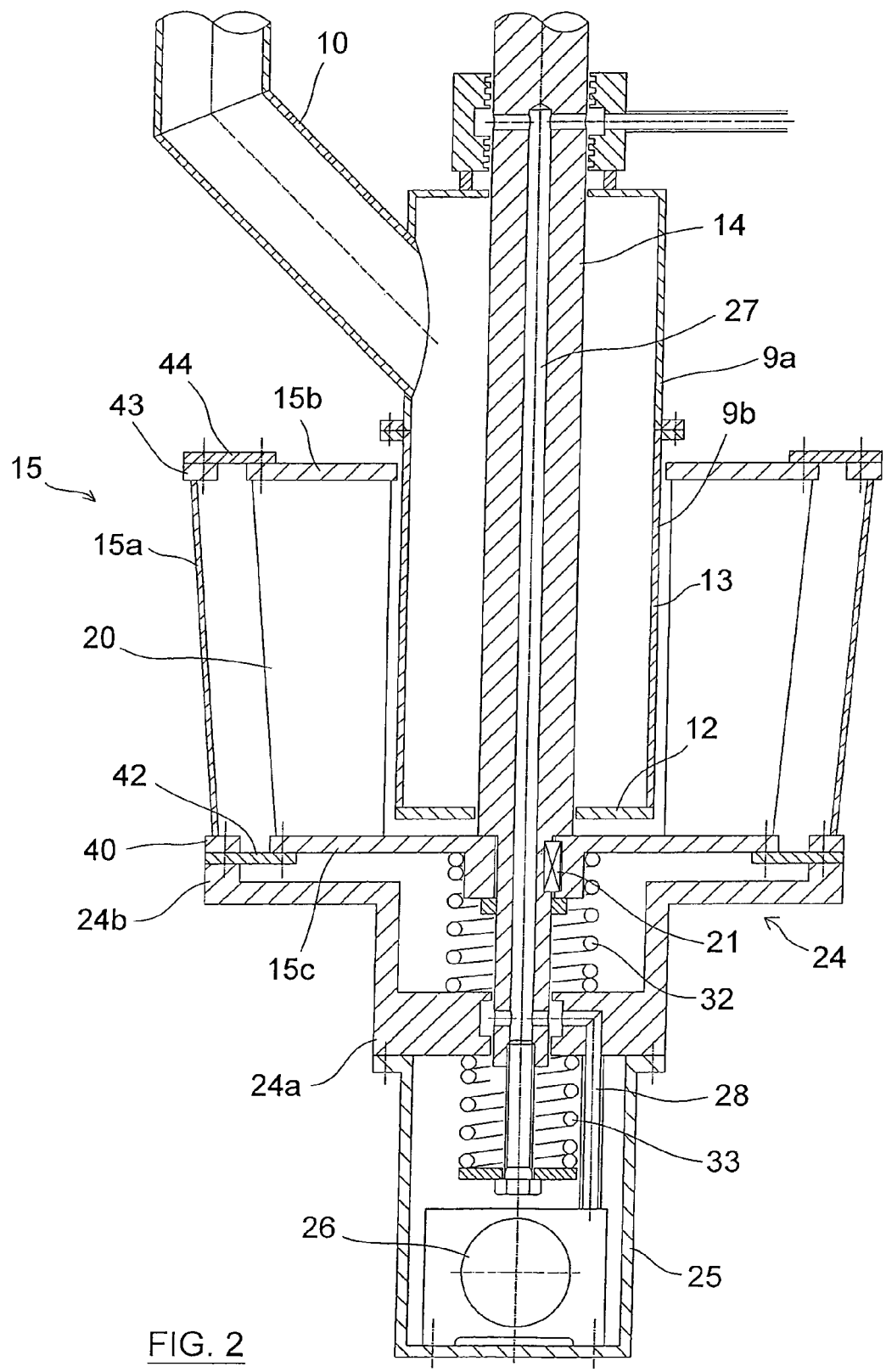
FIG. 2 shows a schematic cut-out view of a detail of the apparatus of FIG. 1.

The vibrating device 26 is firmly coupled to the flange 24, namely to its central portion 24a, being able to transmit a vibrating action to said flange. The flange 24 is elastically supported, in the axial direction A-A, to the end of the shaft 14, by a first spring 32 and a second spring 33 as seen in FIG. 2. Other elastic means, e.g. elastomers, may be used instead of said springs 32, 33. Damping means can also be provided, if necessary.

The peripheral portion 24b of the flange 24 is firmly connected, e.g. by screws, to a bottom fixing portion 40 of the side wall 15a, which in the given example is a metal ring welded to the lower rim of the side wall 15a, which is also made of metal.

An elastic ring 42 is provided for the connection of said fixing portion 40 of side wall 15a to the peripheral region of bottom plate 15c. The elastic ring 42, for example, has inner and outer circumferential holes, so that there is a first set of screws connecting said region 24b of flange 24 to said fixing portion 40 with interposition of elastic ring 42, and a second set of screws fixing the elastic ring 42 to the plate 15c. Accordingly, the upper rim of the side wall 15a has a fixing portion 43 and an elastic ring 44 is provided for connection to the top plate 15b.

Fixing portions 40 and 43 have preferably a thickness greater than side wall 15a, to provide suitable room for the fixing means between said elastic rings, top and bottom plate of the bucket and side wall of the same.

It should be appreciated that said elastic rings 42, 44 provide a flexible connection between the perforated side wall 15a and the remaining parts of the bucket 15, namely the plates 15b and 15c, while the side wall 15a is firmly connected, through the flange 24, to the vibrating engine 26. The flexible connection of said rings 42, 44 substantially acts as a mechanical filter for the vibrating forces, i.e. the vibrating forces imparted to the side wall 15a are substantially not transmitted to the plates 15b, 15c. It should also be noted that rings 42, 44 are substantially rigid in the torsional direction, i.e. when shaft 14 is rotating, they are able to transmit torque from lower plate 15c to flange 24 and side wall 15a.

Elastic rings 42, 44 are preferably made of an elastomer.

As stated above, in equivalent embodiments of the apparatus according to the invention, the flexible connection is made with one or more expansion joint(s), e.g. two expansion joints mounted in the same positions as elastic rings 42, 44. In other embodiments, the side wall 15a can also be mechanically separated from the frame part of the bucket.

The invention operates as follows. The liquid substance is fed through duct 10 and hopper 9 to the rotating prilling bucket 15, which produces a downward flow F of droplets (FIG. 1) into the tower 1. The vibrating engine 26, through the flange 24, imparts a vibrating action to the perforated side wall 15a according to the axis A-A. Elastic rings 42, 44, providing a flexible connection between the side wall 15a and plates 15b, 15c, act as filters for the vibrating forces, keeping the rest of the bucket 15 (i.e. parts other than perforated side wall 15a) substantially isolated from the vibrations.

The alternate, vibrating motion of perforated side wall 15a imparts a vibration to the liquid jets exiting the perforated side wall itself. Said vibration is a disturbance which helps the breaking up of the liquid jets into a stream of uniform droplets.

The mass which is put in vibration is limited substantially to the mass of side wall 15a, flange 24 and other small parts (e.g. fixing parts 40, 43 and screws), while the plates 15b, 15c, the impellers 20 and the substantial amount of liquid contained in the bucket are not put in vibration.

The invention claimed is:

1. A granulation process of a given substance in a fluid state, comprising the steps of:
   feeding said fluid substance to a rotating prilling bucket, located inside a prilling tower, containing a given liquid mass of said substance and having a perforated side wall;
   spraying said fluid substance from said prilling bucket into the prilling tower in the form of liquid jets through said perforated side wall; and
   subjecting said liquid jets to a vibration according to the axial direction of the prilling tower, while the liquid mass contained in the bucket is kept substantially free from said vibration, and said vibration is imparted to the liquid jets by subjecting said perforated side wall to a vibrating action and isolating the remaining parts of the prilling bucket from said vibrating action.

2. The process according to claim 1, wherein said given substance is urea.

3. An apparatus for the granulation of a fluid or semi-fluid substance, comprising a prilling tower and a rotating prilling bucket which is located inside said tower and connected to feeding means of said substance and to a rotating driving shaft, wherein the prilling bucket comprises a frame part and a perforated side wall, and is connected to suitable vibration imparting means, adapted to provide a vibrating action substantially according to the axial direction of said prilling tower, wherein said vibration imparting means are connected to said perforated side wall of the bucket, and said perforated side wall is vibrationally decoupled from the frame part of the same, so that the operation of said vibration imparting means results in a vibration of the perforated side wall, while the frame part of the bucket is kept substantially isolated from the vibrating action.

4. The apparatus according to claim 3, comprising a suitable flexible connection between said perforated side wall of the bucket and said frame part of the same, said flexible connection being adapted to act as a mechanical filter for said vibrating action.

5. The apparatus according to claim 4, wherein the frame part of the prilling bucket comprises a top plate and a bottom plate, and the perforated side wall is connected to said top plate by a first flexible connection, and is also connected to said bottom plate by a second flexible connection.

6. The apparatus according to claim 5, wherein said first and second flexible connections are obtained through a first elastic ring, secured to a top fixing portion of the perforated side wall and to the top plate, and a second elastic ring secured to a bottom fixing portion of the side wall and to the bottom plate of the bucket.

7. The apparatus according to claim 6, wherein said top fixing portion and bottom fixing portion of the perforated side wall are obtained through metal rings having a thickness greater than the side wall, and welded to the upper and lower rim, respectively, of the same side wall, to provide room for fixing screws between said elastic rings, top and bottom plate of the bucket and side wall of the same.

8. The apparatus according to claim 6, wherein said first elastic ring and second elastic ring are made of an elastomer.

9. The apparatus according to claim 8, wherein said first elastic ring and second elastic ring have a multi-layered structure.

10. The apparatus according to claim 4, wherein said flexible connection(s) is (are) made with expansion joint(s).

11. The apparatus according to claim 4, wherein said flexible connection(s) is (are) made with connecting element(s) having a suitable thickness to act as a filter for the vibrations.

12. The apparatus according to claim 4, wherein said flexible connection between the perforated side wall of the bucket and the frame part of the same is substantially flexible in the axial direction of the bucket, but substantially rigid in the torsional direction, thus being suitable to transmit a rotational driving torque.

13. The apparatus according to claim 12, wherein it further comprises a driving flange, connected to said rotating shaft and having a peripheral region fixed to the perforated side wall of the bucket.

14. The apparatus according to claim 13, wherein said driving flange is elastically supported, according to said axial direction, at the bottom end of the rotating shaft, by elastic means.

15. The apparatus according to claim 13, wherein said vibration imparting means are directly associated to said driving flange.

16. The apparatus according to claim 3, wherein said vibration imparting means are pneumatic, fed through a compressed air duct coaxial to the rotating shaft.

* * * * *